(12) United States Patent
Line

(10) Patent No.: US 7,807,244 B2
(45) Date of Patent: Oct. 5, 2010

(54) BENDABLE TOUCH FASTENER PRODUCTS

(75) Inventor: Kevin Keith Line, Port Severn (CA)

(73) Assignee: Velcro Industries N.V., Curacao (AN)

( * ) Notice: Subject to any disclaimer, the term of this patent is extended or adjusted under 35 U.S.C. 154(b) by 425 days.

(21) Appl. No.: 11/937,359

(22) Filed: Nov. 8, 2007

(65) Prior Publication Data

US 2008/0120815 A1 May 29, 2008

Related U.S. Application Data

(60) Provisional application No. 60/865,339, filed on Nov. 10, 2006.

(51) Int. Cl.
*A44B 18/00* (2006.01)

(52) U.S. Cl. .................. 428/36.9; 428/99; 428/100; 24/442

(58) Field of Classification Search ............. 428/36.9, 428/99, 100; 24/442, 452; 297/218.2, 228.13, 297/452.13, 219.1, DIG. 6; 138/115
See application file for complete search history.

(56) References Cited

U.S. PATENT DOCUMENTS

| | | | |
|---|---|---|---|
| 3,923,442 A | 12/1975 | Stohr | |
| 4,729,409 A * | 3/1988 | Paul | 138/115 |
| 5,236,243 A | 8/1993 | Reyes | |
| 5,900,303 A | 5/1999 | Billarant | |
| 7,141,283 B2 | 11/2006 | Janzen et al. | |
| 2001/0007166 A1 | 7/2001 | Shimamura et al. | |
| 2002/0023322 A1* | 2/2002 | Murasaki | 24/452 |

FOREIGN PATENT DOCUMENTS

| | | |
|---|---|---|
| GB | 2361663 | 10/2001 |
| JP | 07186160 | 7/1995 |

OTHER PUBLICATIONS

European International Preliminary Report on Patentability for App. No. PCT/IB2007/004529, dated May 14, 2009, 12 pages.

* cited by examiner

*Primary Examiner*—Alexander Thomas
(74) *Attorney, Agent, or Firm*—Fish & Richardson P.C.

(57) ABSTRACT

A bendable touch fastener product having a longitudinally continuous foundation member that has an array of touch fastener elements, having respective resin stem extending outwardly from an outer surface of the foundation member, such that the array of fastener element is bounded by longitudinal array edges and spaced apart from opposite side sealing surfaces, and a method of manufacture of the bendable touch fastener product.

19 Claims, 13 Drawing Sheets

BENDABLE TOUCH FASTENER PRODUCTS

CROSS-REFERENCE TO RELATED APPLICATIONS

This application claims the benefit under 35 U.S.C. §119 (e)(1) of U.S. provisional application 60/865,339, filed Nov. 10, 2006, which is incorporated by reference herein in its entirety.

TECHNICAL FIELD

This invention relates to flexible touch fastener products in general, and to incorporating touch fasteners into molded articles such as seat cushions.

BACKGROUND

Male touch fasteners are commonly incorporated into molded objects, such as polyurethane foam seating cushions, during a molding process, for securing a fabric cover over the cushion.

Hook and loop touch fasteners, such as those sold under the trademarks "VELCRO" and "ULTRAMATE," are well known and are used to join two members detachably to each other. This type of fastener has two components. Each has a flexible substrate or base, having one component of the fastening system on the surface thereof One surface typically carries resilient hooks while the other carries loops. When the two surfaces are pressed together they form a releasable engagement.

The hooks can be any of a variety of shapes, including cane-shaped, palm tree-shaped and mushroom-shaped, all of which are well known within the art. As used herein, the terms "hook," "hook-type" and "hook-like" shall be construed to mean any such configuration of loop-engaging element.

Touch fasteners are used in the manufacture of automobile seats in the attachment of an upholstered seat cover, ("trim cover"), to a polyurethane foam bun. One portion of the separable touch fastener is incorporated into the surface of the polyurethane seat bun during the foam molding process. The mating portion of the separable fastener is attached to the seat cover to provide releasable attachment to the foam seat bun. The separable fastener assembly used in the foam mold for incorporation in the bun surface typically is the hooked or male portion of the separable fastener system. This hook portion has a base carrying resilient hooks on one surface. The surface of the base obverse of the hook-carrying surface may act as an anchoring surface.

In some assemblies a magnetically attractive material is attached to the base to temporarily hold the fastener in a trough or channel of the mold cavity wall, which is equipped with magnets. It is also possible to incorporate magnetically attractive material into the body of the fastener itself, such as in a plastic material that is used to make the fastener.

In other known set-ups, the fastener is secured in the mold by a snug-fit, such as within a trench that is slightly narrower than the fastener, or upon a pedestal that fits into a foam doughnut that carries the fastener, with the doughnut having a smaller inner diameter than the outer diameter of the pedestal.

To form a molded foam product incorporating a touch fastener, the fastener is secured to one surface of a clamshell mold; a chemical mixture, for instance of a diisocyanate and a polyol, is injected into the mold; the mold is closed and clamped shut while the chemicals react and blow to form a flexible foam.

During the foaming process it is useful to keep the foaming resin from flowing between the discrete male fastener elements, and various sealing means have been developed. For example, a protective layer, often in the form of a thin plastic film, may be placed over the resilient hooks (before they are placed in the mold) to prevent incursion of foam into the hooks during the molding process. After molding, the film or other cover is removed to expose the fastener elements. Gaskets have also been provided around the perimeter of touch fastener products, to inhibit foam intrusion into the hook area.

Another challenge to using fasteners of the type described above in connection with molded products, foam or otherwise, is that it is often desirable to attach the fastener to a contoured surface, perhaps one that curves through three dimensions. All of the fasteners described above, in their basic configuration, are made as continuous elongated rectangular sheets, which are typically used as is, or stripped into narrower strips, all of which remain basically rectilinear. Relatively stiff fastener strips can be bent, relatively easily, through two dimensions, out of the plane of the strip. However, bending in the plane of the strip would result in creasing or puckering, as would bending around two or more axes in three dimensions. Bending is further complicated by some fastener element covering schemes, as bending may cause the cover to buckle or separate from the substrate, and thus to fail for its intended purpose.

It is possible to make large planar sheets and cut from them any desired fastener shape. However, this procedure typically results in a relatively high amount of waste material. Another possible solution is to use numerous separate relatively small fasteners, each of which must be separately placed in and fixed to the mold.

Often designers wish to include a relatively deep recess in a fabric covered product, such as in particular, cushions for automobiles, airplanes, boats, etc. A deep recess in the cushion requires a sharp crease in the seat cover, which in turn requires a flexible, unobtrusive means for securing the cover to the deepest recesses of the cushion. The sharper the crease, the narrower must be the fastening device. Using a narrower fastener reduces the area of interface between the fastener and the foam, and also between the two complementary fastener components.

SUMMARY

In one aspect of the invention, a touch fastener component includes an elongated, flexible foundation member having an exterior anchoring surface on one side and a fastening surface on an opposite side. The fastening surface carries an array of touch fastener elements. The foundation member is hollow and defines a resiliently compressible interior cavity.

In another aspect of the invention, a touch fastener product includes a hollow foundation structure and an array of touch fastener elements having stems extending outwardly from an outer surface of the foundation structure. The array of fastener elements is bounded by longitudinal array edges and is spaced from opposite side sealing surfaces of the touch fastener product disposed on opposite sides of the foundation structure.

In another aspect of the invention, a flexible touch fastener product includes an elongated flexible core, a longitudinally continuous fastener strip having a strip-form base, and an array of male touch fastener elements. The longitudinally continuous fastener strip is attached to an outer surface of the flexible core. The male touch fastener elements have stems extending outwardly from the base. The fastener strip is attached so as to define a series of local flexure regions spaced apart longitudinally along the flexible core and separated by regions of relatively greater flexure stiffness.

In some embodiments, the touch fastener elements are loop-engageable, male touch fastener elements.

For some applications the outer surface of the touch fastener product features an anchoring surface opposite the touch fastener array. In some cases, the anchoring surface is devoid of touch fastener elements. The anchoring surface carries, in some applications, a plurality of anchor elements. The anchor elements may project outwardly from the anchoring surface and away from the foundation member, for example. In some cases, fabric is applied to the anchoring surface.

In some embodiments, the fastener elements each have stems of resin integral with resin of the fastening surface of the foundation member.

In some configurations the fastener elements extend from the fastening surface to a distance less than about 0.21 times a radius of curvature of the fastening surface in lateral cross-section.

In some cases, the fastening surface is convex in lateral cross-section, such that fastener elements of the array extend from the fastening surface in different directions.

The fastener elements are, in some embodiments, arranged in spaced apart, longitudinal rows. In some cases, the fastener elements of the array are arranged in no more than nine longitudinal rows. In certain cases, the fastener element array has a fastener element density of between 10 and 30 fastener elements per square centimeter. The fastener elements of each row may include longitudinally spaced apart segments of an extruded rail.

In some embodiments, the touch fastener product includes at least one gasket. The gasket is preferably configured to inhibit intrusion of foam or other materials into the hook area of the fastener. The gasket may also inhibit the fastening component from floating out of a trench in a mold during the introduction of molding material. In some cases, the gasket is attached to at least one of the side sealing surfaces. The gasket extends, in some implementations, from one side sealing surface around the anchoring surface to the other side sealing surface to form a gasket on both side sealing surfaces. In some embodiments, the gasket is resiliently flexible and compressible and is adhered to the foundation member between the fastening surface and the anchoring surface. Some examples include two such compressible gaskets adhered to the foundation member and disposed on opposite sides of the fastener. When the flexible touch fastener product includes an elongated flexible core, a gasket can be attached to opposite sides of the flexible core. In some cases, a gasket is attached to opposite surfaces of the flexible core on either side of the fastener strip.

In some implementations, the foundation member has a substantially circular cross-section.

Some examples of the foundation member define two interior cavities separated by a longitudinal interior wall. In some cases, the interior wall is a flexible membrane.

The interior cavity or hollow of the foundation member is filled, in some embodiments, with a material to form a solid core or with a resiliently compressible foam. The compressible foam may inhibit kinking of some configurations of folded or bent fastener components.

In some embodiments, the material forming the solid core is polyethylene. In certain embodiments, the foundation member includes a compound of EPDM rubber, compounded with polypropylene, and/or a thermoplastic material. In some cases, the foundation member includes a material more flexible than the material of the fastener elements.

In some implementations, a material having ferromagnetic properties, such as iron, is integrated with the foundation member or solid or flexible core. The material having ferromagnetic properties can temporarily hold the fastener in a trough or channel of the mold cavity wall, which is equipped with magnets.

In some cases, the array of fastener elements is carried on a flexible strip spirally or helically wrapped around and adhered to the foundation member or flexible core. In certain cases, the flexible strip is spirally wrapped such that edges of adjacent wraps are longitudinally spaced from each other. Gaps between adjacent windings can define local flexure regions. In some embodiments, the fastener strip is attached longitudinally along the core, with the base of the strip forming a pattern of discontinuities that form the local flexure regions. One example features a zigzag pattern, with the discontinuities forming direction reversals of the zigzag pattern.

Another aspect of the invention features a molded polymeric body with a foam body having an external surface and a touch fastener component adhered to the external surface. The fastener component includes a flexible, hollow foundation member defining a compressible interior volume. The foundation member has an exterior anchoring surface facing and adhered to the foam body. A fastening surface of the foundation member faces away from the foam body and carries a plurality of hook-type fastener elements.

In some examples the touch fastener component is disposed within a recess defined in the external surface, with the fastener elements facing out of the recess.

In some cases, a resiliently flexible, compressible gasket is adhered to both the foundation member and the polymeric body.

The interior volume of the foundation member may be filled with a resiliently compressible foam, as discussed above.

In some embodiments, a plurality of anchor elements extend from the anchoring surface and are embedded into the foam body.

A fabric cover extends about the foam body in some applications, and is secured by the touch fastener component.

Another aspect of the invention features a method of making a touch fastener component, including extruding a longitudinally continuous, hollow, flexible foundation member defining a resiliently compressible interior volume and providing an array of hook-type fastener elements on a fastening surface of the foundation member.

In another aspect of the invention, a method of manufacturing an elongated touch fastener product includes extruding a longitudinally continuous hollow foundation member and forming an array of touch fastener elements having respective resin stems extending outwardly from an outer surface of the foundation member. The array of fastener elements is formed bounded by longitudinal array edges, and wherein the array is spaced from opposite side sealing surfaces of the fastener product disposed on opposite sides of the foundation member.

In another aspect of the invention, a method of manufacturing a flexible touch fastener product includes providing an elongated flexible core having an outer surface, and attaching a longitudinally continuous fastener strip to the outer surface of the flexible core. The fastener strip has a strip-form base and an array of male touch fastener elements having respective stems extending outwardly from the base. The fastener strip is attached so as to define a series of local flexure regions spaced apart longitudinally along the flexible core and separated by regions of relatively greater flexure stiffness.

In some cases, a resiliently flexible, longitudinal gasket is provided. The gasket can extend from a side of the foundation member between the fastening surface and an anchoring surface opposite the fastening surface. The gasket may be provided by adhering a preformed gasket strip to a side of the extruded foundation member, extruding a longitudinally continuous, flexible sealing strip extending from the hollow foundation member, and/or by applying a bead of liquid gasket material to a side surface of the extruded foundation member, and allowing the gasket material to stabilize to become attached to the foundation member. In some embodiments, a gasket is attached to each side sealing surface. The attached gasket can extend from one side sealing surface over the anchoring surface to the other side sealing surface.

In some cases, forming the touch fastener elements include extruding resin to form longitudinal rails on the foundation member outer surface while extruding the foundation member, and then cutting the rails to form respective longitudinal rows of discrete touch fastener elements. The foundation member can be stretched in the longitudinal direction after cutting the rails, to space apart the fastener elements in each row. In some embodiments, an anchoring surface is formed on the outer surface opposite the touch fastener array.

In another aspect of the invention, a method of making a polymeric body having a touch fastener component includes providing a mold and a touch fastener component. The mold defines a curved, elongated trench with side walls, and the trench curves along a plane in an interior surface of the mold. The touch fastener component includes an elongated, flexible foundation member having an exterior anchoring surface on one side and a fastening surface on an opposite side. The fastening surface carries an array of touch fastener elements. The foundation member is hollow and defines a resiliently compressible interior cavity. The fastener component is placed into the trench in the mold, such that the fastener component curves to follow the trench, with the fastening surface facing a bottom of the trench. A liquid molding material is introduced into the mold, such that it contacts the anchoring surface of the fastener component. The molding material is allowed to solidify into a molded body into which the fastener component has been molded. The molded body and incorporated fastener component is removed from the mold.

Various embodiments of the invention can be particularly useful with molded objects having relatively deep, narrow recesses, or in providing fastener element arrays disposed along a two-dimensional curve or three-dimensional contour, without requiring custom-shaped fastener components, or placing several separate fasteners. The fastener component may be efficiently made by extrusion processes, for example, or by joining preformed, longitudinally continuous materials to form a bendable composite.

Various implementations of the invention include different combinations of one or more of the above-described features. The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
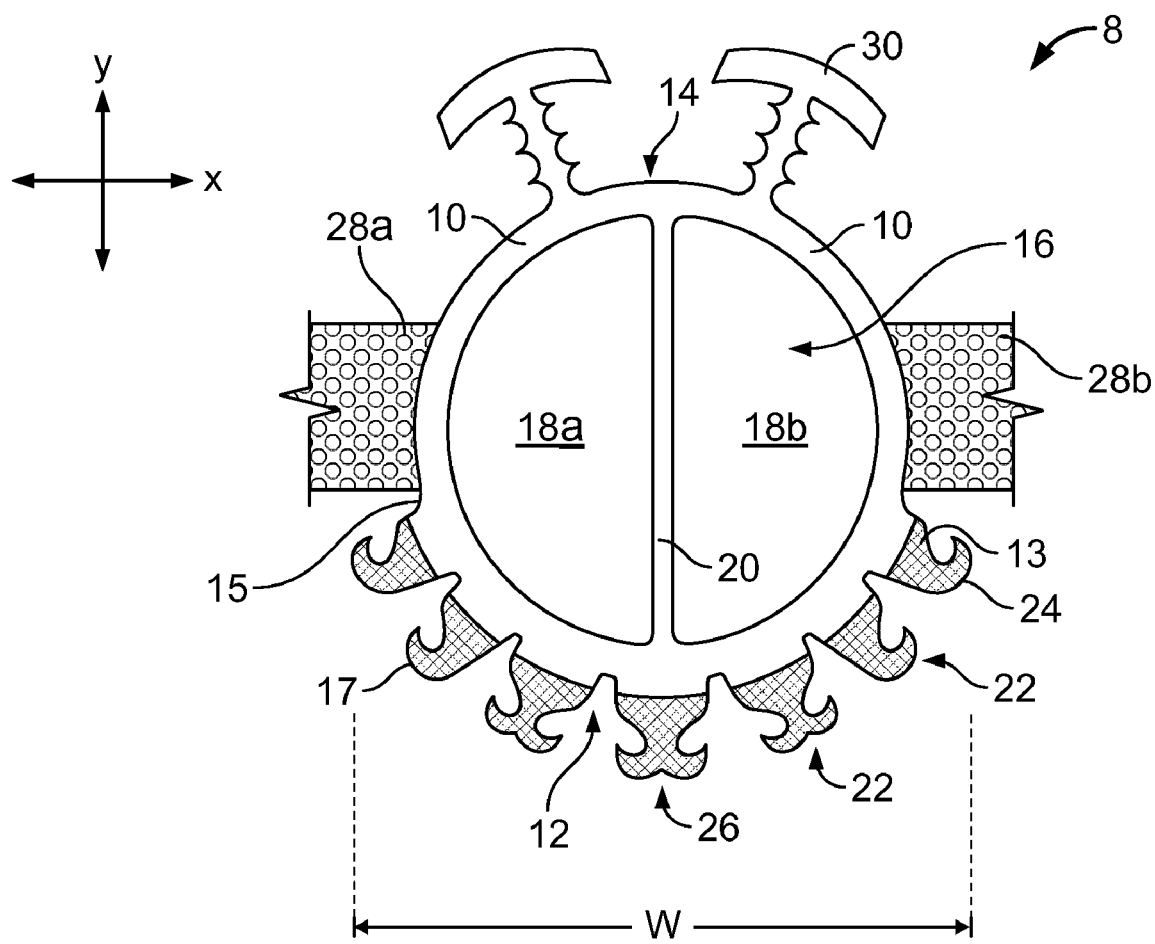
FIG. 1 is a schematic cross-sectional view, along lines 1-1 of FIG. 2, of a fastener having a hollow circular tubular foundation carrying hooks around a portion of its perimeter.
Figure 2:
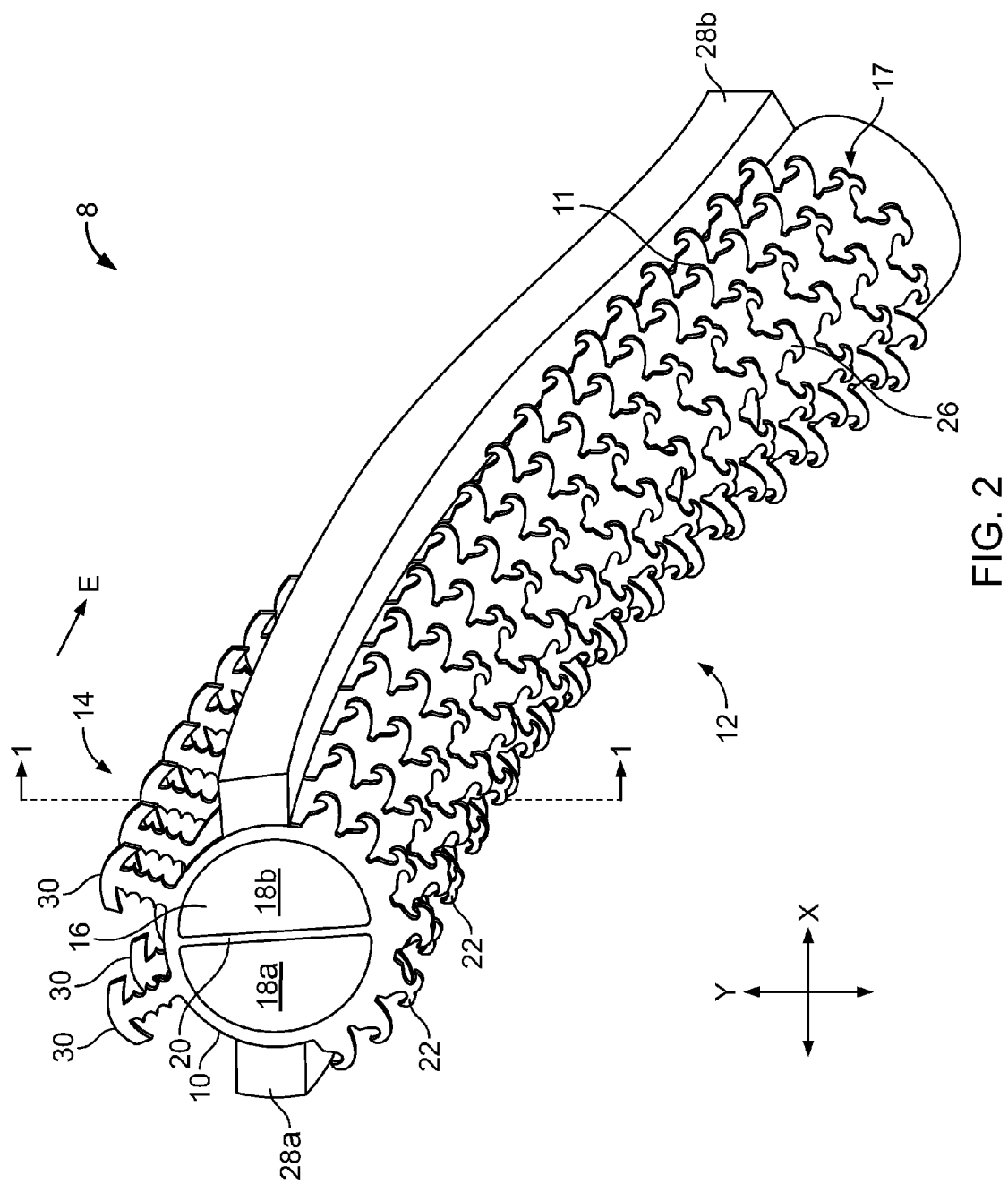
FIG. 2 is a perspective view of the fastener.

Referring to FIGS. 1 and 2, an embodiment of a fastener component 8 has a foundation member 10 that has an exterior fastening surface 12 and an exterior anchoring surface 14. It also defines an interior volume 16 that is resiliently compressible, in this case composed of chambers 18a and 18b that are separated by a flexible membrane 20. The chambers 18a and 18b may be empty, or partially or completely filled with a resiliently compressible material such as a foam. Providing foam fill may prevent kinking of some configurations of folded or bent fastener components. In other embodiments, foundation member 10 can be a solid flexible core, which for example can be made of foam or any other material providing the foundation member with the ability to be molded in a snake-like manner during use. A plurality of fastening elements 22 are carried on the fastening surface 12. Typically, the fastening elements 22 are hook-type elements for use with loop-type elements. Single cane shaped elements 24 and double hook, palm-tree shaped hook-type elements 26 are both shown in FIG. 1. In some cases, touch fastener elements 22 include stems 13 integral with and extending outwardly from the fastening surface 12.

A pair of resiliently flexible, compressible gaskets 28a and 28b are adhered to the foundation member 10, creating a barrier between the anchoring surface 14 and the fastening surface 12, as discussed below.

A plurality of anchoring elements 30 are carried on the anchoring surface 14. The type of anchoring element will depend on the particular application. In this case, T-shaped elements are shown. Other possible configurations include: no anchor elements, or a foam surface glued on to the anchor area, or a loop material, or hook-type elements, or any other configuration that would allow the foam to adhere to anchoring surface 14.

The components and features discussed above are also shown with reference to FIG. 2, a perspective view of the fastener component, showing that it is typically elongated in a direction E that is perpendicular to the plane of the cross-section shown in FIG. 1. Thus, there are many rows 17 of hooks 26 extending along the dimension into the paper of FIG. 1. By "row," it is meant a pattern of fastening elements in a straight line. The fastening elements are aligned in rows along the long dimension of the fastener, and in lateral rows across the fastening surface in cross-sectional view. To avoid confusion, circumferential rows around the perimeter are referred to herein as "perimeter rows." Rows along the long dimension are referred to herein as "lengthwise rows." Hooks in a given perimeter row may be identical, or different. The hooks in successive perimeter rows may be aligned with each other relative to their position around the perimeter of the fastening surface, or they may be staggered, or aligned with hooks in another row, such as alternating rows, or any pattern that is useful. Similarly, lengthwise rows can be identical, regular, irregular, staggered, or any configuration.

Together, the rows form an array 11 of touch fastener elements. The array 11 of touch fastener elements 22 is bounded by longitudinal array edges 15. The array 11 is spaced from opposite side sealing surfaces of the touch fastener component 8 disposed on opposite sides of the foundation member 10.

The anchor elements 30 are also positioned along the length of the fastening element, for use anchoring the fastening component into a molded body, as discussed below. The shape, size, composition, and positioning of the anchor element 30 will depend on the type of material into which it is molded, the type of fastening element 22 used, the type of cover to which it is attached and the expected frequency of separation.

Figure 3:
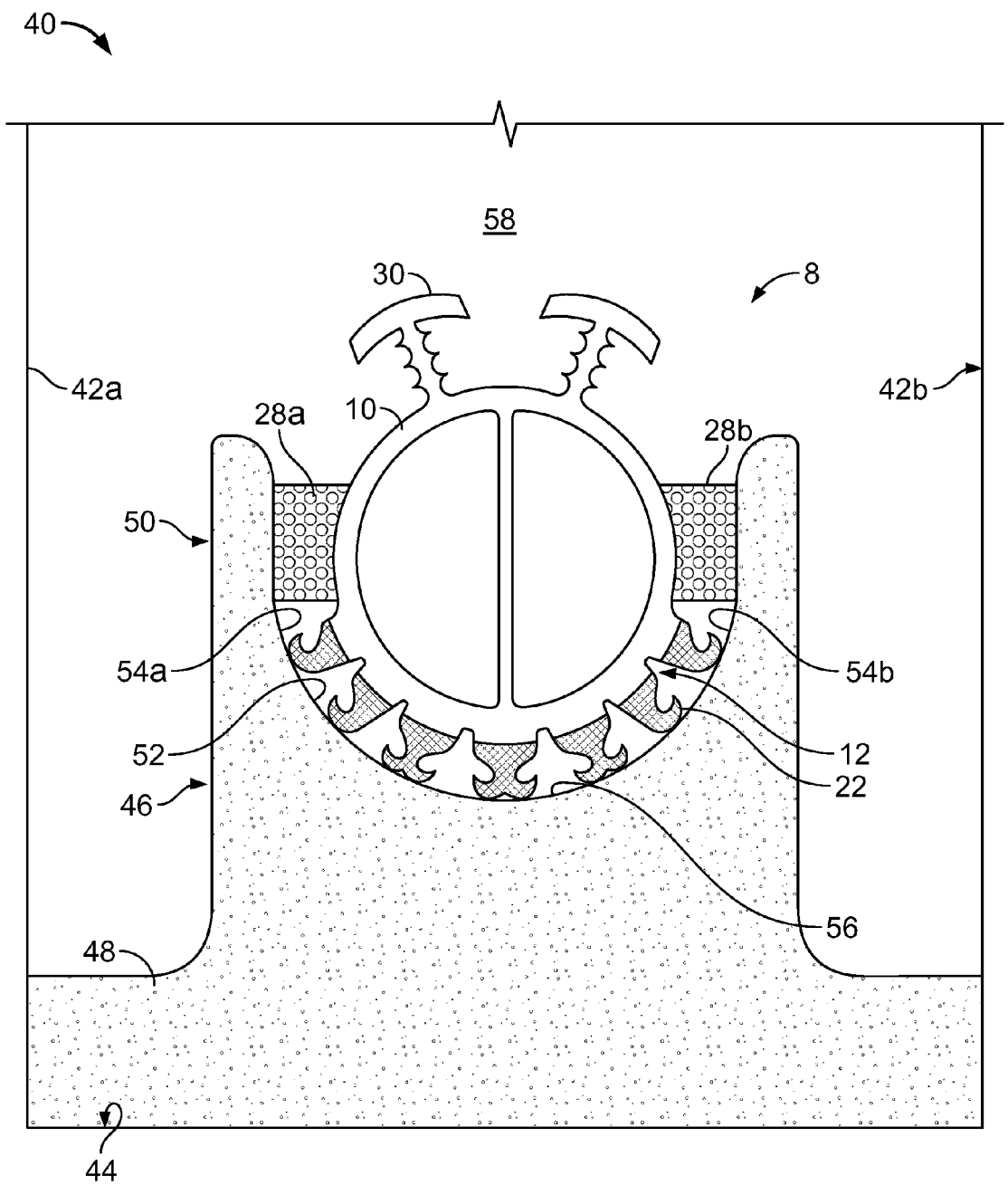
FIG. 3 shows the fastener of FIG. 1 in place in a trench, within a pedestal, in a mold to form a foam or other plastic part.
Figure 4:
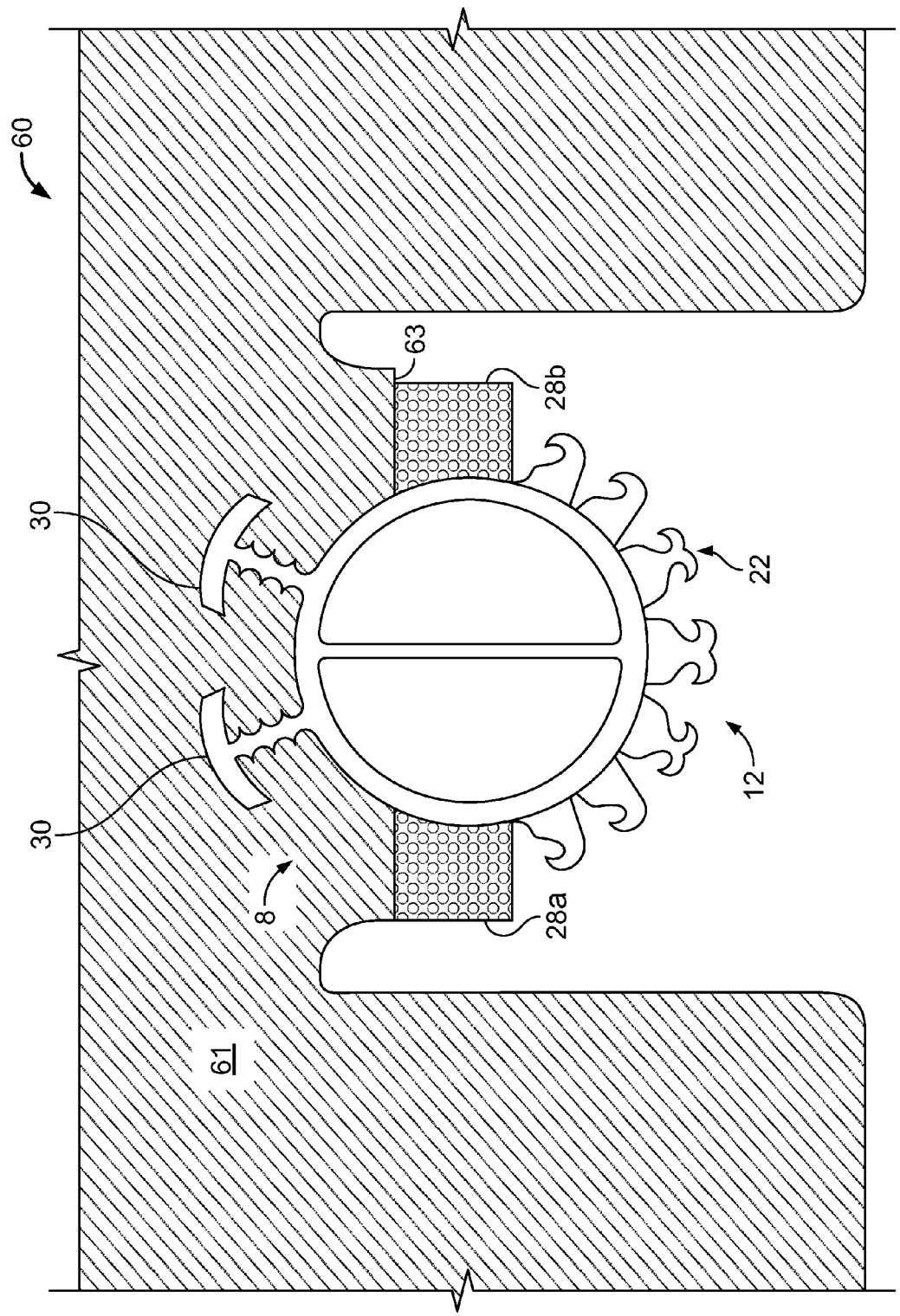
FIG. 4 is a cross-sectional view of a molded product formed in a mold, with the fastener shown in FIG. 3.
Figure 5A:
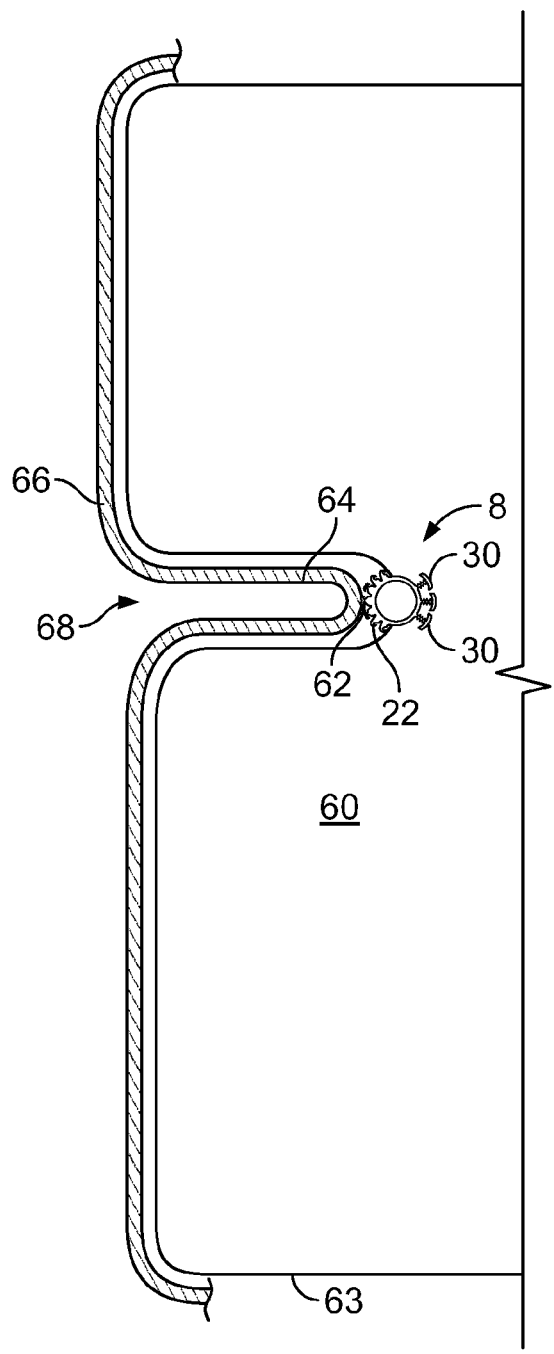
FIG. 5A shows the product of FIG. 4, with a fabric trim cover attached.

Use of the fastening product is shown with reference to FIGS. 3, 4 and 5A. FIG. 3 is a cross-sectional view of a fastening component, such as is shown in FIGS. 1 and 2, positioned in a mold in which an article, such as a foam seat cushion, will be made. A mold 40 is shown schematically as having side walls 42a and 42b, a floor 44 and a pedestal 46. The pedestal 46 has a base 48, which extends between the mold side walls 42a and 42b, and a standing portion 50, defining a trench 52, that itself has side walls 54a and 54b, and a curved bottom wall 56. The pedestal 46 and the trench 52 are elongated, in a direction that extends generally perpendicular to the plane of the paper of FIG. 3. The trench may be straight, or curved in a plane in two dimensions from left to right, as shown, and it may also undulate in two dimensions in a plane up and down, from the top of the page to the bottom, as shown. It may be curved through three dimensions in space. It may run parallel to the mold walls 42a and 42b, or at any angle thereto.

In use, a fastener component 8 is inserted into the trench 52, such that the fastening elements 22 face the bottom wall 56 of the trench 52, and the anchoring elements 30 are facing into the cavity 58 of the mold. The gaskets 28a and 28b extend along the length of the fastening component, as discussed above, and are sized and shaped relative to the trench such that the fastening element is resiliently press-fit into the trench, with the gaskets 28a and 28b compressed laterally against the side walls 54a and 54b of the trench with enough interference to retain the fastening component 8 in the trench during the molding operation, as discussed below. Typically, the press-fit can be established simply by the operator applying finger pressure to press the fastener into the trench.

During a molding operation, molding material fills the mold cavity 58. As the mold material is poured or flowed into the mold, it is typically liquid and may tend to infiltrate between the mold body and the fastening surface 12 of the fastener component 8. The gaskets 28a and 28b prevent this. The gaskets are also sized so that they establish a snug fit in the trench, to prevent the fastening component from floating out of the trench during the turbulent conditions of molding material introduction and foam solidification. This can be used in conjunction with or in place of other types of hold-down arrangements, such as magnetic schemes.

A molded product 60, including fastener component 8 incorporated in molded body 61, is shown in cross-section in FIG. 4. The fastening elements 22 are free of fouling from the molding material. The hooks 22 face outward, away from the body of the molded product 60. The material of the molded product is typically adhered to the gaskets 28a and 28b, but is prevented from passing past the gasket to foul the fastening elements 22. Thus, the hooks 22 are free to engage complementary fastening elements, such as, shown in FIG. 5A, loops 62 of a loop-type component 64 that is adhered to a fabric trim cover 66. As shown in FIG. 5A, the foam seat cushion 60 has a deep, narrow recess 68 defined in the external surface 63, into which the trim cover 66 is pressed. With the fastener component 8, the recess may be very narrow. Such a narrow trench arrangement would be difficult to achieve with a flat, straight, wide fastener strip. Note that FIGS. 3 and 4 show a relatively short pedestal 46 and a correspondingly shallow recess. In contrast, FIG. 5A shows a deeper recess.

Figure 5B:
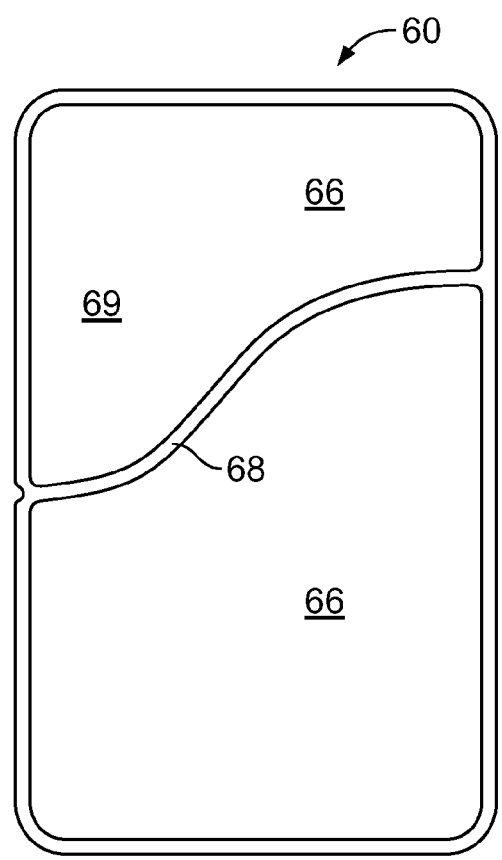
FIG. 5B is a plan view of a seat cushion with a curved fastening recess.

FIG. 5B shows a finished product with a recess 68 that is curved through three dimensions. Such a curve could be introduced by having the pedestal shown in FIG. 3 curve from left to right, as it extends into the plane of the figure shown. The curve is also into and out of the plane of the drawing of FIG. 5B, for instance so that the left hand side 69 of the cushion bulges outward. Such a curve is established by a pedestal that has differing heights along its length, from lower to higher.

By positioning the fastening elements 22, in some embodiments, around the perimeter of a foundation member 10 that has a convex outward facing fastening surface 12, the tips of the hook-type fastening elements 22 are spread away from each other more than are the bases. In other words, hooks of a given perimeter row are 'splayed'. Thus, it is possible to achieve a larger surface area of engagement as compared to the surface area of the base than would be possible with a planar foundation member. That allows the portion of the trench 52 that secures the fastening component to be narrower than with a planar foundation, which in turn enables relatively sharper creases 68 in the trim cover. Further, each hook-type fastening element 22 is more accessible to the complementary loop-type fastening elements 62, which facilitates separable fastening with less precise positioning.

In some embodiments, the fastener 8 is narrow, e.g. having an overall width 'w' (FIG. 6A) of about 13 mm, or in some cases less than 13 millimeters. Care must be taken with such a narrow fastener that it does not pull out from the article 60 into which it is molded. If the article is foam, it is very possible that the separable engagement between the complementary fastening components will equal or exceed the intrinsic strength of the foam. Thus, the anchor elements 30 should be sized and shaped and positioned so that they spread out the force of extraction over a large volume of the foam body, to prevent pull-out.

Curves of any shape can be made using the same elongated fastener component, because it can be bent equally well about either the x or y axes, as shown in FIGS. 1 and 2. Thus, the basic product is provided in long lengths, typically on a roll, which are then cut to shorter lengths as required, and bent to the desired shape. The seat manufacturer does not need to buy, store, pick, and place a multitude of differently shaped and sized parts. A single part is simply measured, cut and press fit into a mold. This saves time and expense at every level of production: design; supply; purchasing; storage; and assembly line set-up and operation. It also enables the seat manufacturer to change its design without parts considerations.

The hooks of the fastener component are protected from fouling by the molding material, without using any cover that must be removed and discarded after use.

The fastener component shown in FIG. 1 has a resiliently compressible, flexible foundation member 10 formed as a hollow, generally cylindrical tube with a flexible internal membrane 20 along the length of the tube. These structures may be of a thermoplastic rubber, such as a composite of EPDM (ethylene propylene diene monomer) and polypropylene, such as is sold under the tradename SANTOPRENE. To increase the engagement force between the hook-type elements and the complementary engaging elements, it is advantageous to provide hooks that are more rigid than the foundation member, for example polypropylene hooks. Moreover, the hollow tube and the hooks could also be formed using other polymers, such that the polymer used for the hollow tube and the polymer used for the hook-type elements have different flexibility and that when co-extruded the polymers bond to each other.

A typical hook-type fastening element flexes as it is pulled away from the loop-type fastening component, and eventually disengages. The hook's flexibility is an important feature in designing the component for disengageability and engageability. The hooks 22, having a wider base portion providing more rigidity, are not very flexible, but the foundation member 10 is flexible, and the foundation member 10 provides the necessary flexibility to facilitate disengagement.

The result of using relatively rigid hooks 22 and a convex exterior engagement surface 12 is that a relatively narrow fastening component 8 can be provided to enable very sharp creases in applied trim covers, without any reduction in the fastener engagement tension per unit distance along the fastener length. It will be understood that with deeper recesses 68 in the molded article 60, it is generally more difficult to reengage loosened trim covers 66. Thus, it is important that a high degree of tension can be established between the separable fastener components to minimize accidental disengagement.

In some embodiments, the fastener has a thermoplastic rubber foundation member 10, composed as described above, with polyethylene hooks 22. The foundation member 10 has a circular cross-section diameter in the range of 5 to 12 mm, for example 9 mm. The hooks extend between about 1 to 2.5 mm from the surface, for example 1.4 mm. Typically, the are between 10 to 30 hooks per $cm^2$ of fastener, for example 15 hooks per $cm^2$. The gaskets are made of open cell foam and extend between 1-5 mm from the outside surface of the fastening member, for example 3 mm, for a total width of 15 mm in the exemplary embodiment. This entire piece would be press fit into a trench having a width of about 12 mm, thus having an interference of 3 mm.

Figure 6A:
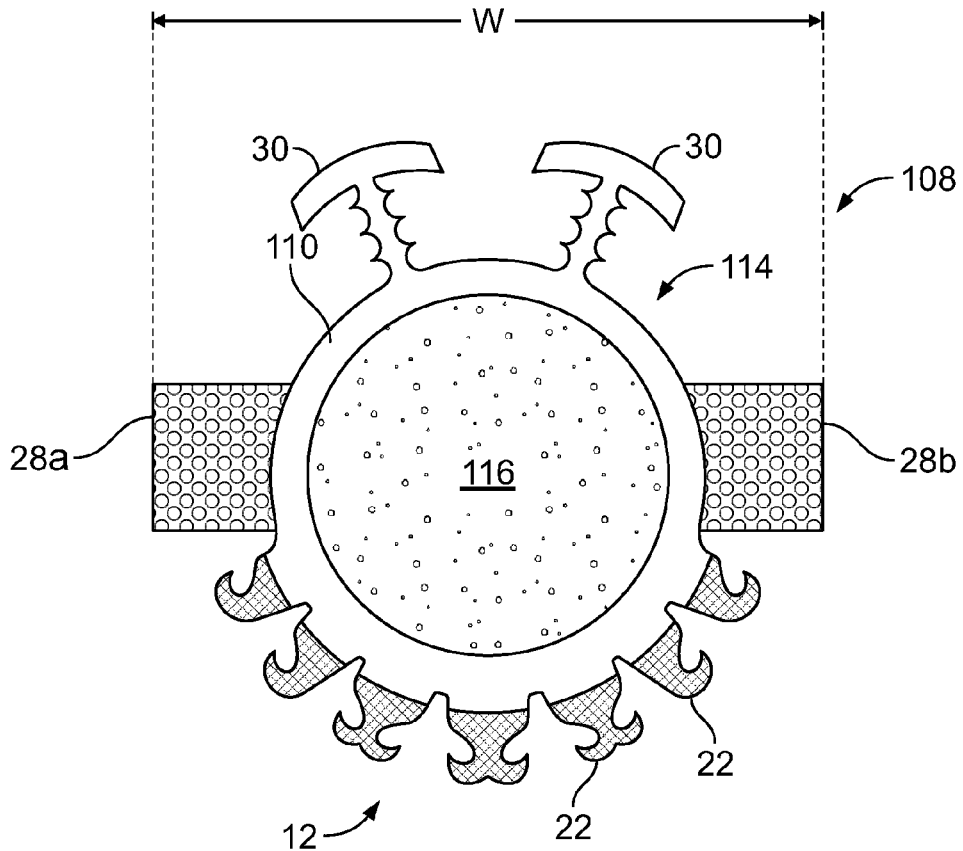
FIG. 6A is a cross-sectional view of a fastener as shown in FIG. 1, but foundation filled with a foam.

FIG. 1 shows a fastening component 8 with a hollow foundation member 10. This is not required. As shown in FIG. 6A, rather than being hollow, some embodiments of the fastening component 108 have a solid interior volume 116 that is, compressible. Filled foundation members resist undesirable kinking, which sometimes arises when a part is bent around a small radius relative to its cross-section. Examples of suitable filling material include a wide variety of foams, such as urethane, and recycled rubber tires, or recycled polyurethane foam, or recycled newspaper, or polyester pillow material. However, hollow foundation members may be more economical, because they incorporate less material.

Figure 7:
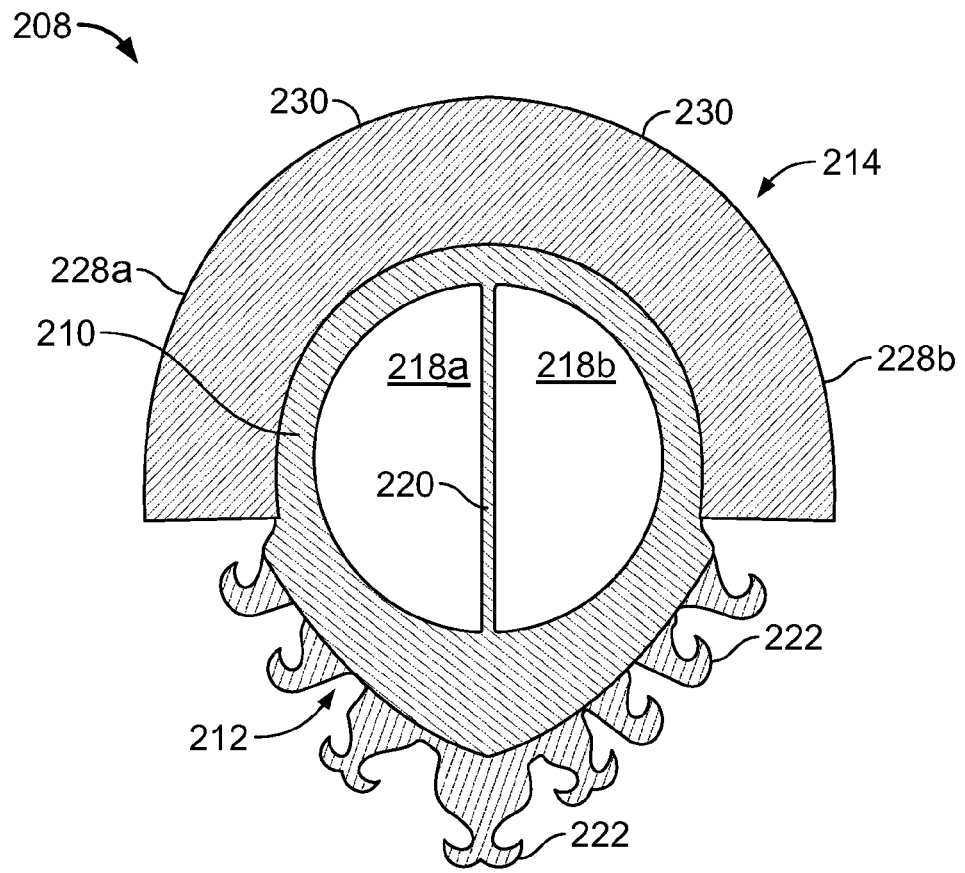
FIG. 7 is a cross-sectional view of a fastener with a foundation having a non-circular cross-section, with an open celled foam anchoring surface.
Figure 8:
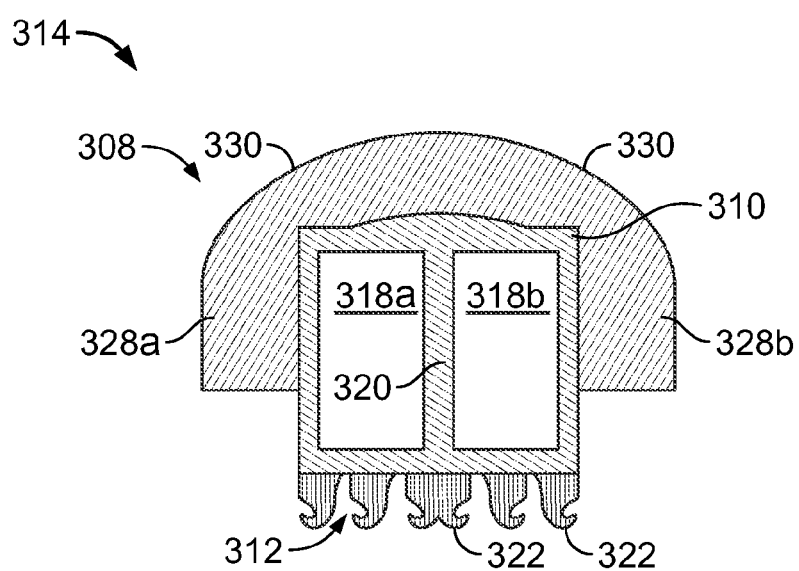
FIG. 8 is a cross-sectional view of a fastener as shown in FIG. 7, but with a foundation having a rectangular cross-section.

FIG. 1 shows a fastening component 8 with a foundation member 10 having a circular cross-section, spreading out the hook tips relative to their bases, as discussed above. Some embodiments provide a convex-outward facing fastening surface 12 for the foundation member 10 that is not circular. It can be elliptical, pyramidal 212, as shown in FIG. 7, or any other convex shape. Further, if a convex surface is not required, then a planar fastening surface 312 may be provided on the foundation member 310, such as by using a tube having a rectangular cross-section, as shown in FIG. 8.

Figure 10:
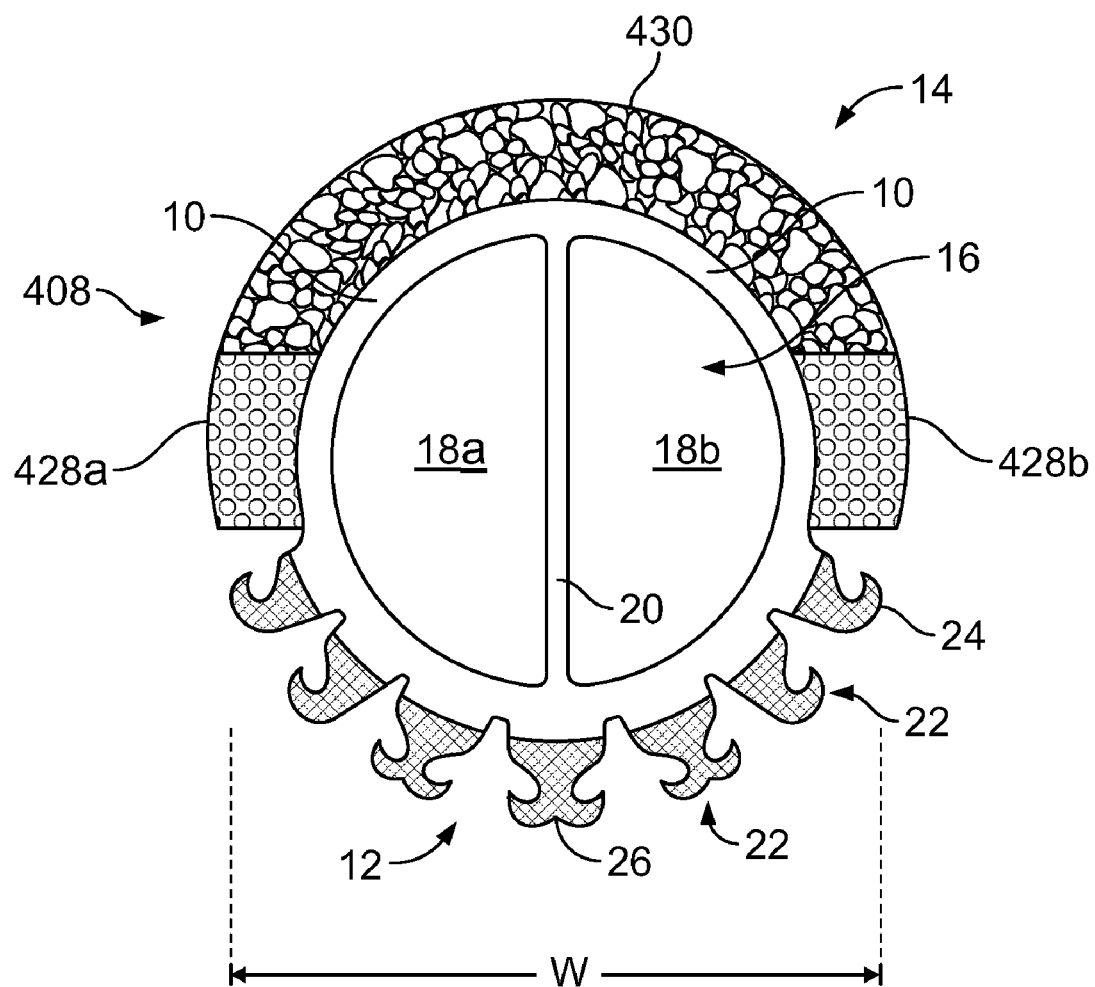
FIG. 10 is a cross-sectional view of a fastener embodiment with side gaskets and an open-cell foam anchoring surface.
Figure 11:
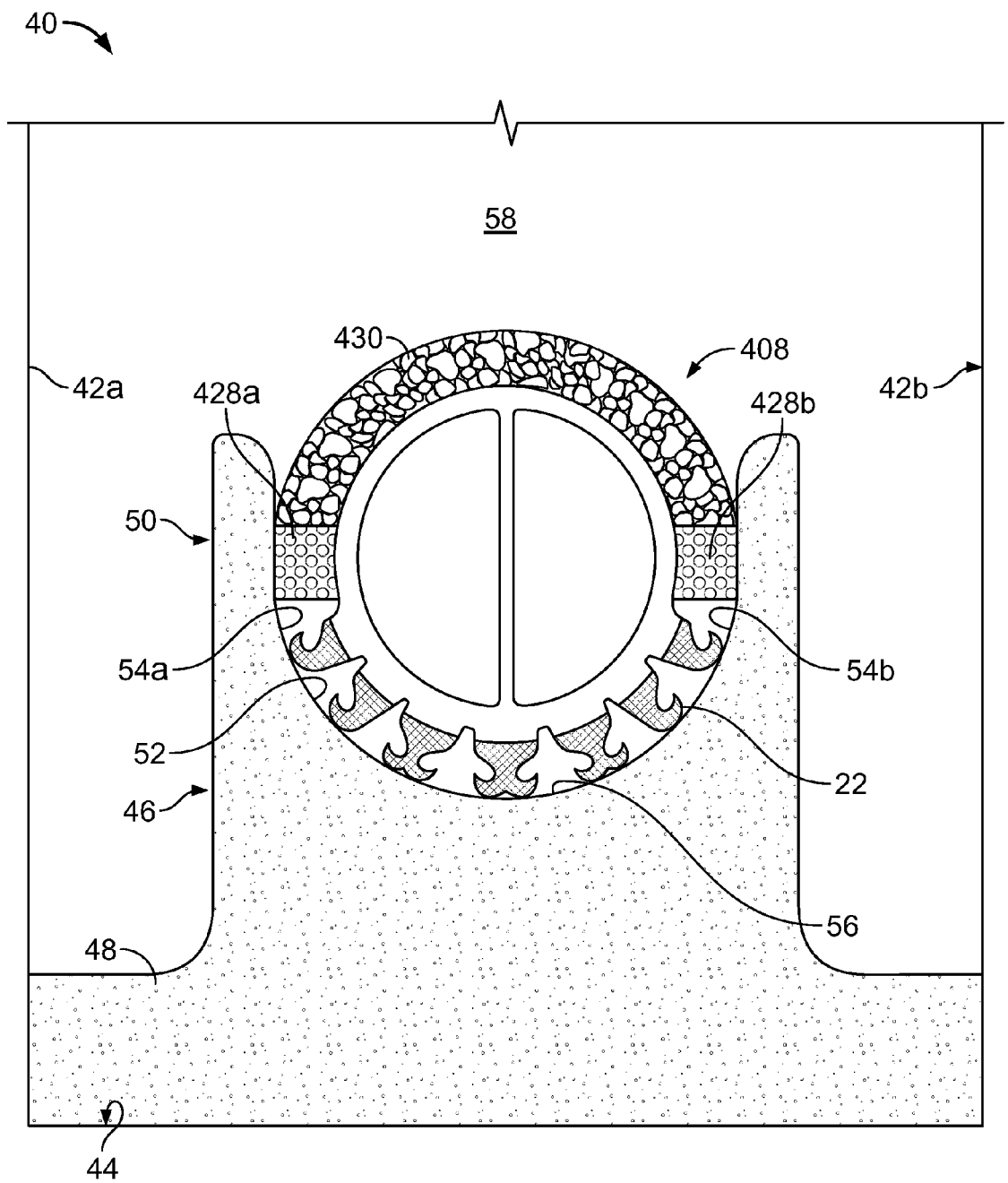
FIG. 11 shows the fastener of FIG. 10 in place in a trench, within a pedestal, in a mold to form a foam or other plastic part.

In some embodiments, rather than individual anchor elements 30, as shown in FIG. 10, the anchor function can be performed by a unitary sheet 430 of open cell foam, which is an extension of lateral gaskets 428a and 428b. The liquid molding material penetrates a bit into the open cells of the foam anchor 430, and thus retains the fastening component 408 in the foam product after the liquid molding material has solidified. Use of such a fastener component in a mold is shown in FIG. 11. Such use is similar to that discussed above for individual anchor elements.

In this embodiment, the fastener has the foam anchor and a thermoplastic rubber foundation member 10, as described above, with polyethylene hooks 22. The unitary gasket/anchor is made of open cell polyurethane foam and extends between 1-5 mm from the outside surface of the fastening member, for example 3 mm, halfway around its circumference. The anchor portion 430 of the unified anchor/gasket need not be continuous along its entire length, although the portion that provides the sealing function should be continuous.

Figure 12:
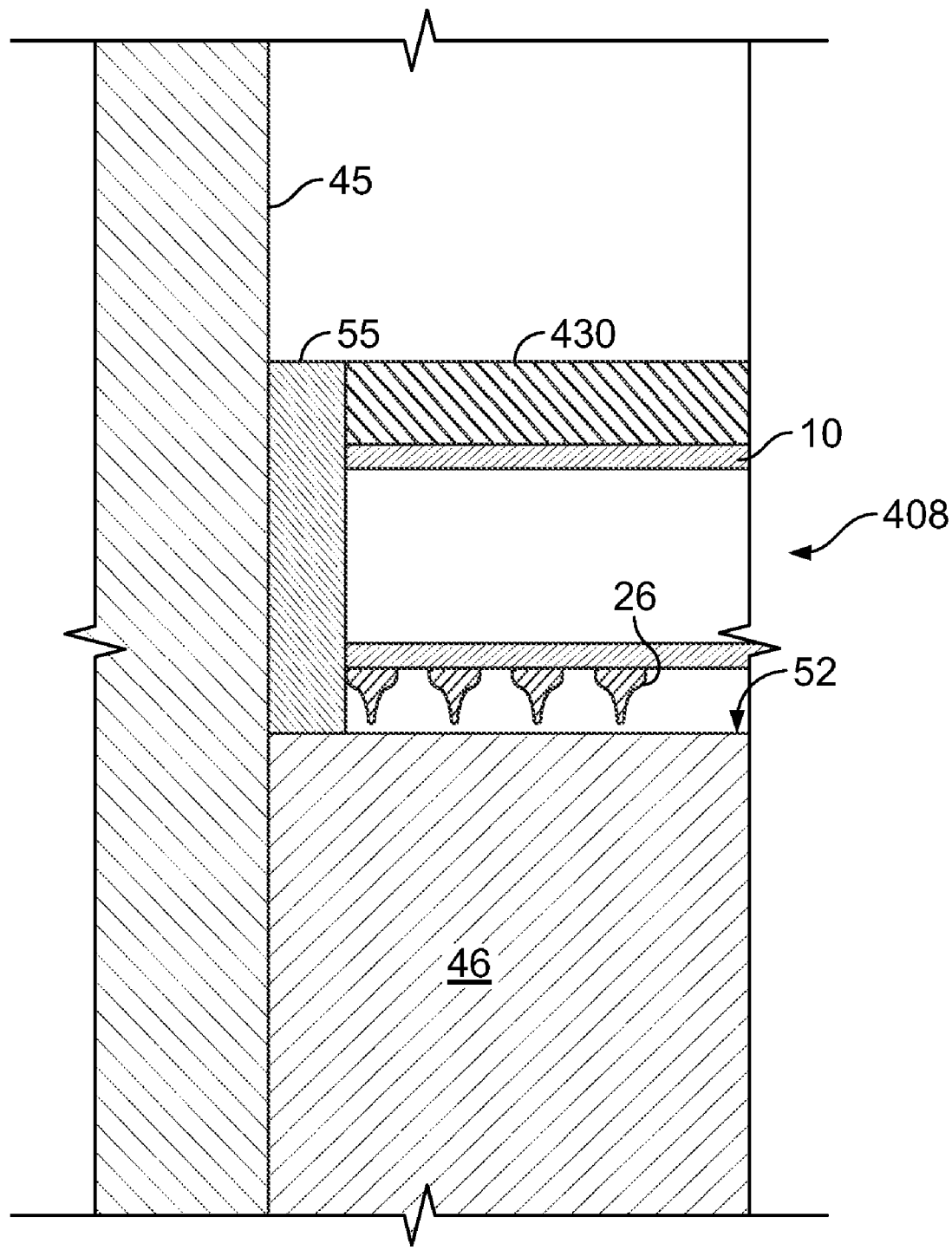
FIG. 12 is a longitudinal cross-sectional view of a fastener such as the one shown in FIG. 10, in place in a mold such as shown in FIG. 11, showing an end seal.

In some embodiments, the fastening component can be provided with a seal or gasket at its end, to prevent incursion of molding material around the product end to foul the hooks. Such an embodiment is shown with reference to FIG. 12. A fastener 408, such as shown in FIG. 10, with a foam anchor 430, is shown in lengthwise cross-section, resting in a trench on a pedestal 46, with the fastening elements facing the trench bottom 52. An end seal 55 cooperates with the anchor/gasket 430 to prevent molding material from reaching the fastening elements 26 by passing between a mold wall 45 and the end of the fastening component 408. The end seal is typically a foam gasket of the same material as are the side gaskets, which may be glued onto fastener 408.

The foregoing has illustrated placing the fastening component in a trench, in a pedestal, rising from the bottom wall of the mold. The trench may also be in a side wall of the mold, as the press-fit is adequate to retain the fastening component in such an orientation also. In addition, it is not necessary that there be a pedestal. All that is required is a trench, or narrow confine in which the fastening component is press-fit. Of course, without a pedestal, the fastening component will not be within a recess in the molded article.

Figure 9:
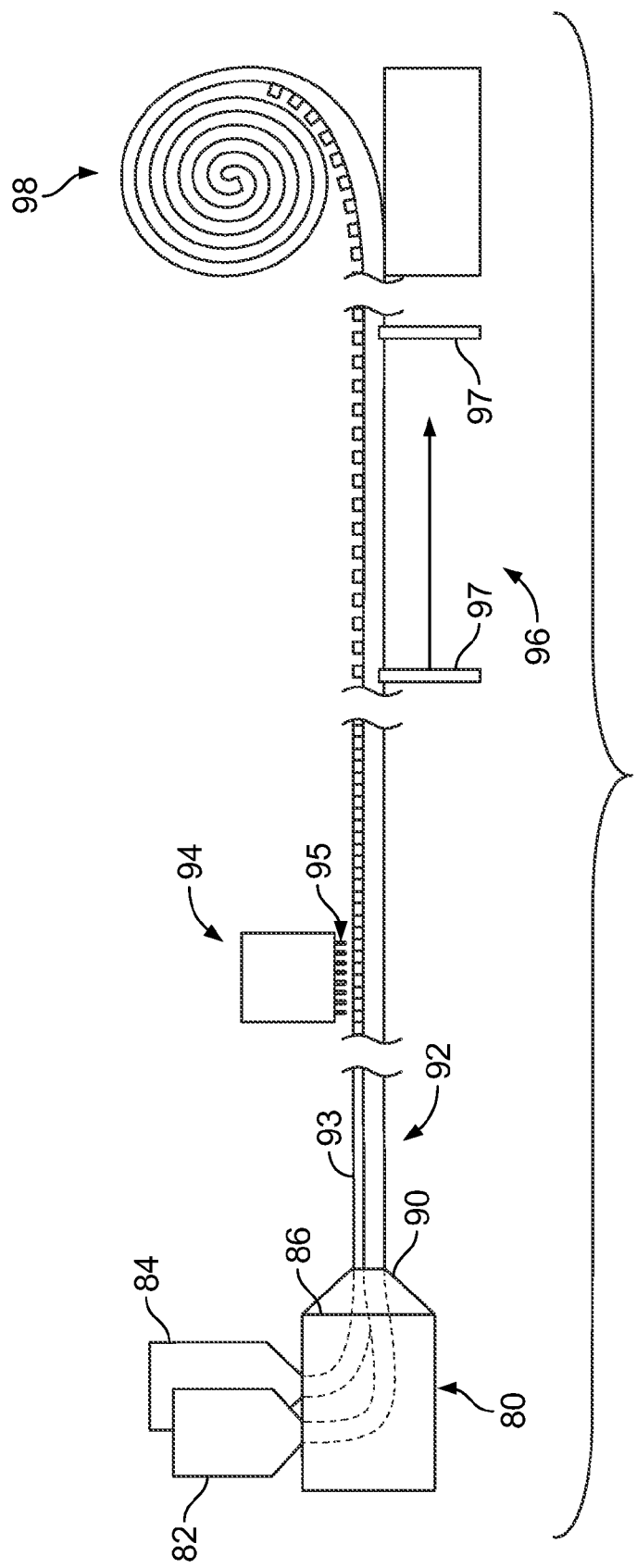
FIG. 9 illustrates an apparatus and associated method for making a fastener.

Fastening components can be made in a variety of ways. The fastening elements and the foundation member can be co-extruded, using an apparatus as shown schematically in FIG. 9. An extruder 80 has a pair of material hoppers 82 and 84. One hopper 84 provides the material for the fastening elements and the other 82 for the foundation. The two streams pass separately through individual orifices in a cross-head die 86. The extruded, shaped streams then coalesce in the die, emerging through the nozzle 90, adhered to each other. Typically, the orifice for the foundation is a cross section that looks very much like the cross-sectional view of the foundation shown in FIG. 1. The orifice for the fastening elements is typically more complex, for example, in this embodiment it can be seven separate orifices, one for each of the hooks in a perimeter row, as shown in FIG. 1.

The extruded shape emerges from the nozzle 90 as a beam 92 having a foundation, and for example, seven continuous rails 93, each of which has a cross-section shaped like the cross-sections of the hooks 24 and 25 shown in FIG. 1. At this point, the extruded part may be cooled. A cutting stage 94 includes blades 95 which cut the seven continuous rails 93 across their widths to form individual elements. A stretching stage 96 includes stretching component 97, which stretches the foundation member along its length, to space apart the individual hooks formed by the cutting of the rails. The elongated tape is then cooled, and rolled up into a roll 98, for subsequent use.

If individual anchor elements such as shown in FIG. 1 are used, they would typically also be co-extruded with the foundation, through additional orifices in the die.

In some embodiments, the foundation hopper 82 would be charged with the above mentioned EPDM compounded with polypropylene. The fastening element hopper 84 is charged with polypropylene. These two extruded streams will readily bond, due to the common presence of polypropylene in both. Other combinations of foundation and fastening material are also possible, as long as a sturdy bond is created upon co-extrusion.

Figure 6B:
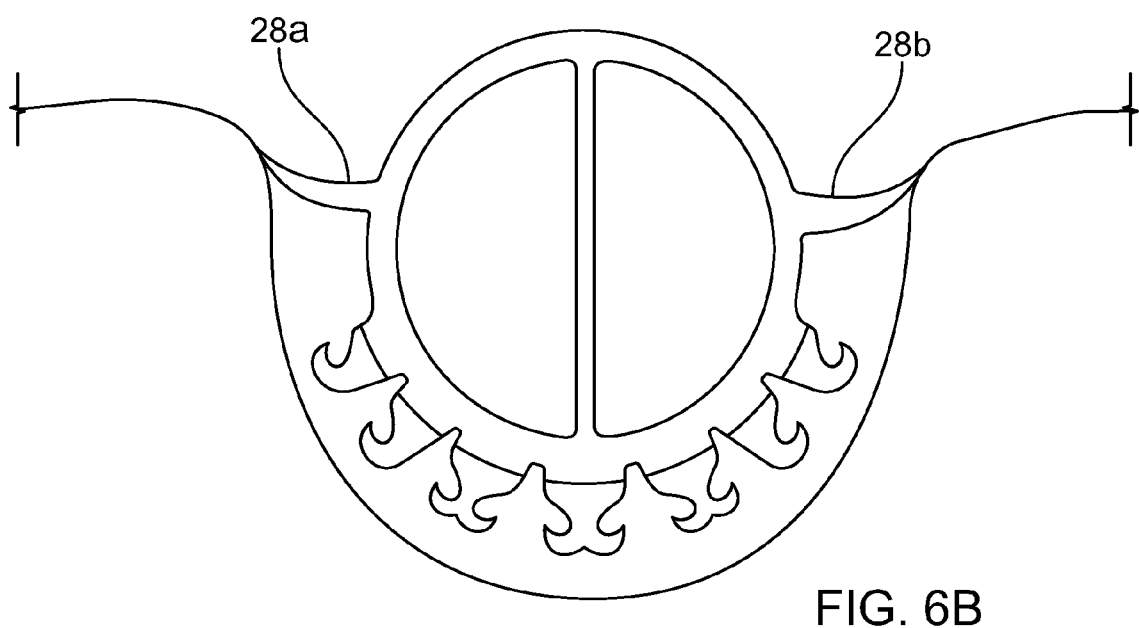
FIG. 6B is a cross-sectional view of a fastener having extruded side sealing members.

The side gaskets can be attached at various stages in production. They can be provided as a foamed up hot melt, added either just before the part is rolled up into the roll 98, or in a subsequent, totally separate operation. Alternatively, preformed foam strips of gaskets can be glued onto the side of the formed foundation. Gaskets 28a and 28b in the shape of a thin blade, such as a windshield wiper blade, as shown in FIG. 6B could be formed during the extrusion process. Additionally, by using a crosshead die the foam gasket material could be applied during the extrusion process when making the foundation. A foam gasket or film gasket can be applied (glued on or ultrasonically welded) to the foundation, such that it covers the foundation from one side sealing surface over the anchor surface to the opposite side sealing surface. This can be seen in FIG. 10, where gaskets 428a and 428b are continuous with foam anchor 430, extending from one side sealing surface over the anchor surface to the other side sealing surface.

Figure 13:
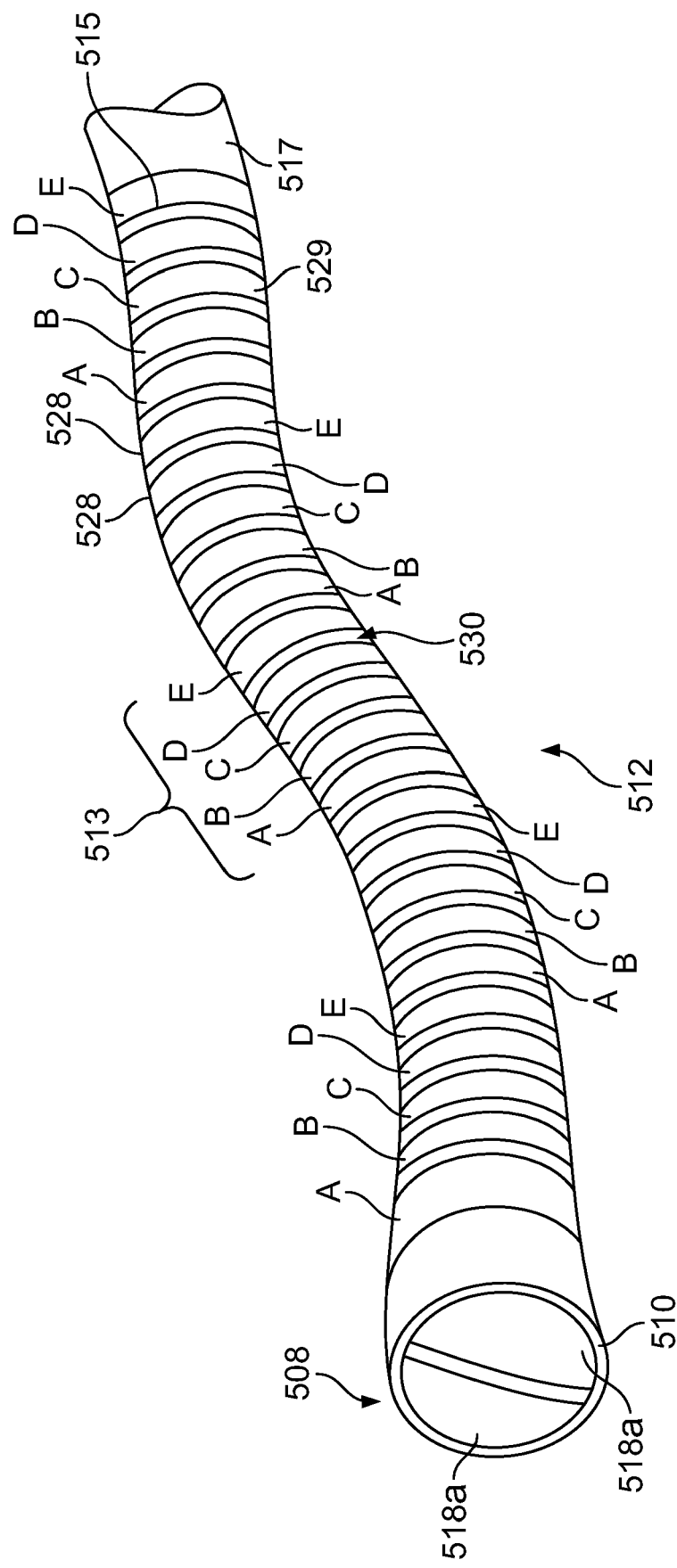
FIG. 13 is a perspective view of a fastener having a hollow tube about which a flat, flexible fastener strip is wrapped.

Another embodiment of the fastener is shown with reference to FIG. 13. Rather than integral, molded fastening elements, this embodiment of the fastener 508 has a plurality, 513A-E of individual strips of hook-type fastening elements having a strip-form base 515. Each individual strip is wrapped spirally around the outer surface 517 of the cylindrical foundation 510 (which can be a solid flexible core, such as expanded polyurethane) such that the edges of adjacent wraps are spaced from each other. One or more additional strips are wrapped substantially parallel to the first strip, within the space between edges of adjacent wraps. The edges of adjacent strips 513A-B provide a small space or gap 530 interposed therebetween, the spaces providing a series of local flexure regions 528, providing regions of flexibility. The strips form regions of relatively greater flexure stiffness 529. What is important is that the wrapping be spaced, and tensioned, such that the wrapped foundation 510 is flexible enough to be bent to the desired shapes.

In some embodiments, instead of having a plurality of individual strips, a single strip (such as strip 513A) is wrapped spirally around the cylindrical foundation 510 such that adjacent edges are spaced from each other. The spacing of the edges apart from one another provides a series of local flexure regions 528, which define regions of increased flexibility in the wrapped foundation.

The strips 513A-B, etc., are adhered to the foundation in one of various ways. They can be adhered with adhesive, by heat and pressure, welding, such as ultrasonic, or any other suitable means that provides sufficient adherence.

The hook strip spirally wrapped around a flexible core provides a easy to manufacture product. The product has the desired amount of flexibility in three dimensions. Side gaskets can be easily attached along the edges by shaving off the hooks on the side sealing surfaces of the foundation member/flexible core 510 where the gaskets are to be placed. Then, the gaskets can be glued onto either side of the foundation member. Alternatively, the gasket material can be pressed onto and through the hooks along the sides. Foamable material like KRATON® rubber along with compressed gas such as nitrogen makes for a good gasket material that could be extruded along the sides. The hooks on the side sealing surfaces would allow the extruded rubber to mechanically adhere to the sides. The hooks on the back of the foundation/flexible core 510 can provide superior foam adhesion when the liquid foam sets up over the part. Alternatively, the hooks on the back could be shaved off the foundation/flexible core 510 after the spiral wrapping if a surface without hooks is desired.

Figure 14A:
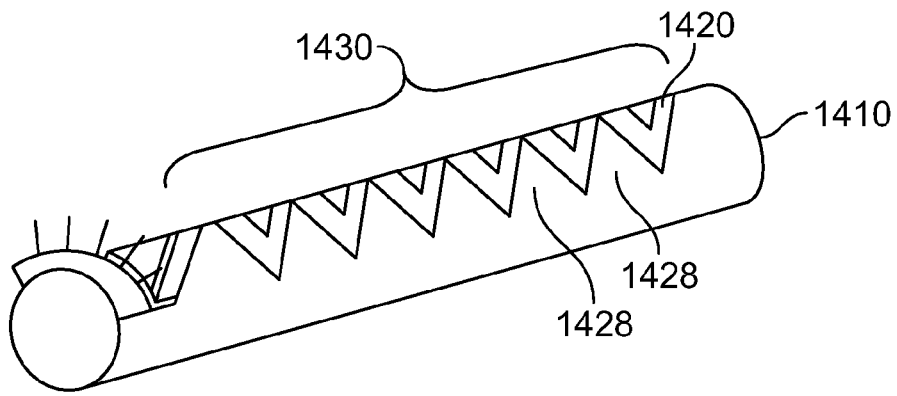
FIG. 14A is a perspective view of a fastener having a flat fastener strip defining a zigzag in its longitudinal dimension, applied to a surface of a tube.
Figure 14B:
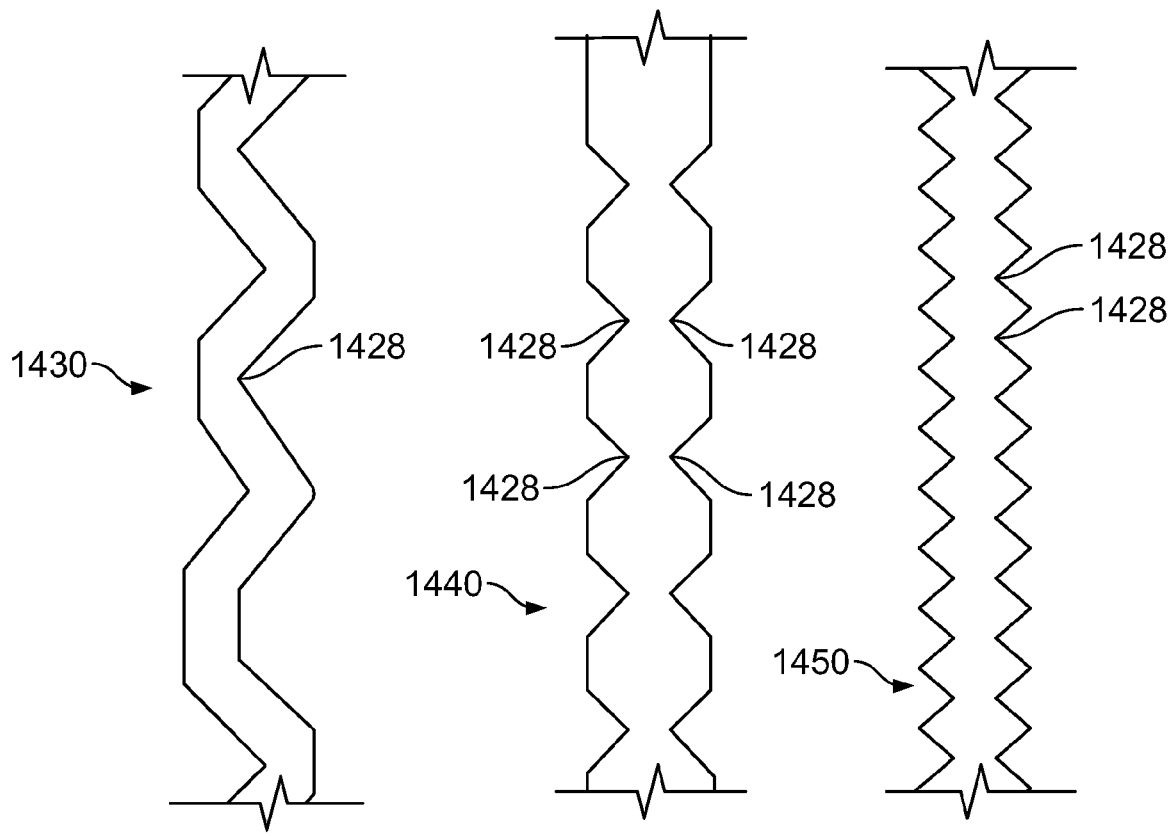
FIG. 14B is a plan view of the flat fastener strip shown in FIG. 14A showing different embodiments of the fastener strip.

Referring to FIG. 14A, a flat planar hook strip 1420 is attached to foundation 1410, which can also be a solid flexible core such as expanded polyurethane. The flat planar strip is attached along a longitudinal surface of foundation 1410. The flat planar hook strip will only bend easily in two dimensions. In order to allow flexibility in all dimensions, V-wedges are cut into the flat planar hook strip prior to its being attached to the foundation 1410. These V-wedges can form for example a zigzag 1430, notched 1440, or diamond 1450 pattern, as seen in FIG. 14B, in the flat planar hook strip, and provide a series of local flexure regions 1428 which are longitudinally spaced along the flexible core/foundation member 1410. Thus, regions of greater flexibility 1428 are interspaced with regions of relatively greater stiffness. The flat planar hook strip 1420 can be attached to foundation member 1410 with adhesives known in the art, using heat or pressure, or by welding using ultrasonic or RF energy. Gaskets can be applied to the sides of the foundation member 1410 by the methods discussed above.

The foregoing discussion has used as an example a molded object 60 that is made of a soft foam material, such as the cushion for seats in automobiles, airplanes, boats, room furniture, etc. However, the fastener component can also be used with other types of molded objects, either made of foam, or of other molded plastic materials, including hard plastics. Suitable plastic materials from which to mold the molded object include thermoplastics, thermosets and elastomers.

A number of embodiments of the invention have been described. Nevertheless, it will be understood that various modifications may be made without departing from the spirit and scope of the invention. For example, the type, shape, and size of the hook fastener elements may be varied, as well as the number of rails provided to form the hook-like fastener elements. Accordingly, other embodiments are within the scope of the following claims.

What is claimed is:

1. A touch fastener component comprising an elongated, flexible foundation member having an exterior anchoring surface on one side and a fastening surface on an opposite side, the fastening surface carrying an array of touch fastener elements,
wherein the array of fastener elements is bounded by longitudinal array edges and is spaced from the anchoring surface of the touch fastener component disposed on the opposite side of the foundation member, and
wherein the foundation member defines a resiliently compressible interior cavity.

2. The fastener of claim 1, wherein the touch fastener elements are loop-engageable, male touch fastener elements.

3. The fastener of claim 1, further comprising a plurality of anchor elements carried by the anchoring surface and projecting away from the foundation member.

4. The fastener of claim 1, wherein the fastener elements each have stems of resin integral with resin of the fastening surface of the foundation member.

5. The fastener of claim 4, wherein the fastener elements are arranged in spaced apart, longitudinal rows, the fastener elements of each row comprising longitudinally spaced apart segments of an extruded rail.

6. The fastener of claim 1, further comprising a resiliently flexible, compressible gasket adhered to the foundation member between the fastening surface and the anchoring surface.

7. The fastener of claim 6, comprising two such compressible gaskets adhered to the foundation member and disposed on opposite sides of the fastening surface.

8. The fastener of claim 1, wherein the foundation member defines two such interior cavities separated by a longitudinal interior wall.

9. The fastener of claim 1, wherein the interior cavity is filled with a resiliently compressible foam.

10. The fastener of claim 1, wherein the array of fastener elements is carried on a flexible strip spirally wrapped around and adhered to the foundation member.

11. The fastener of claim 1, wherein the fastening surface is convex in lateral cross-section, such that fastener elements of the array extend from the fastening surface in different directions.

12. A touch fastener product comprising:
a foundation structure defining a resiliently compressible interior cavity; and
an array of touch fastener elements having stems extending outwardly from an outer surface of the foundation structure, wherein the array of fastener elements is bounded by longitudinal array edges and is spaced from opposite side sealing surfaces of the touch fastener product disposed on opposite sides of the foundation structure.

13. The touch fastener product of claim 12, further comprising an anchoring surface on the outer surface opposite the touch fastener array and devoid of touch fastener elements.

14. The touch fastener product of claim 12, further comprising an anchoring surface on the outer surface opposite the touch fastener array, wherein the anchoring surface has anchor projections extending outwardly therefrom.

15. The touch fastener product of claim 13, wherein a fabric is applied to the anchoring surface.

16. The touch fastener product of claim 12, further comprising at least one gasket, wherein at least one of the side sealing surfaces has at least one gasket attached thereto.

17. The touch fastener product of claim 16, wherein the at least one gasket extends from one side sealing surface around the anchoring surface to the other side sealing surface to form a gasket on both side sealing surfaces.

18. The touch fastener product of claim 12, wherein the interior cavity of the foundation structure is filled with a material to form a solid core.

19. The touch fastener product of claim 18, wherein a material having ferromagnetic properties is integrated with the foundation structure or the solid core.

* * * * *

UNITED STATES PATENT AND TRADEMARK OFFICE
CERTIFICATE OF CORRECTION

| | | |
|---|---|---|
| PATENT NO. | : 7,807,244 B2 | |
| APPLICATION NO. | : 11/937359 | |
| DATED | : October 5, 2010 | |
| INVENTOR(S) | : Kevin Keith Line | |

It is certified that error appears in the above-identified patent and that said Letters Patent is hereby corrected as shown below:

Title Pg., Item (73) Assignee: Delete "N.V.," and insert -- B.V., --, therefor.

Signed and Sealed this
Twenty-eighth Day of December, 2010

David J. Kappos
*Director of the United States Patent and Trademark Office*